Nov. 30, 1943.  W. A. HOLTZMAN  2,335,416
ADJUSTABLE THRESHER SCREEN
Filed July 23, 1941
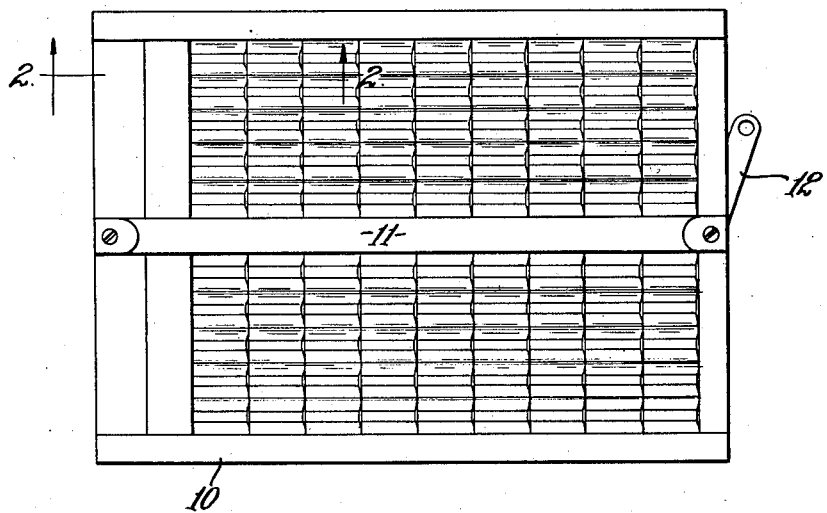
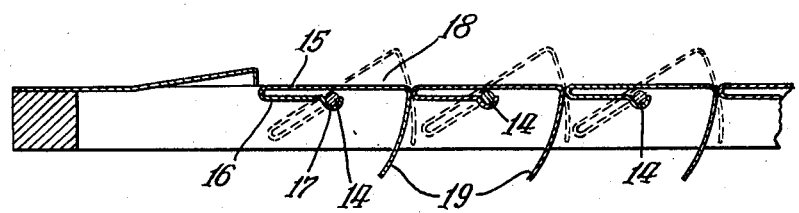
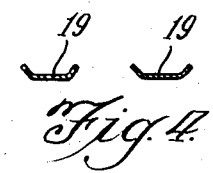
Inventor
William A. Holtzman
By Tefft & Tefft
Attys.

Patented Nov. 30, 1943

2,335,416

UNITED STATES PATENT OFFICE 2,335,416

ADJUSTABLE THRESHER SCREEN

William A. Holtzman, Peoria, Ill., assignor to Hart-Carter Company, Peoria, Ill., a corporation of Delaware Application July 23, 1941, Serial No. 403,603

11 Claims. (Cl. 209—394)

This invention relates to sieves and screens such as are incorporated in grain threshing machines including the modern combined harvester thresher.

It is appreciated by those skilled in the art that the various grain crops present different problems which require variations in the blast, sieves, and screens. The present application is directed to improvements in sieves or screens for such crops as soy beans and is an improvement on the Petersen Patent No. 2,105,986, issued January 18, 1938, and owned by the present assignee.

The particular object of my invention is to provide a structurally stronger and stiffer slat with means to increase the winnowing effect of the air blast by additional baffling effect of the slats as the openings in the sieve or pan are increased.

Another object is to provide a structure in the slat which provides troughs or grooves to direct the grain through the sieve openings.

Other objects and advantages will be disclosed in the following descriptions and drawing, in which:

Fig. 1 is a top plan view of a grain thresher screen or sieve constructed as a complete operative unit;

Fig. 2 is a broken enlarged longitudinal cross-sectional view showing the slats in the screen of Fig. 1 as they would appear on the section lines 2—2 of Fig. 1;

Fig. 3 is a broken enlarged perspective view of one of the improved slats;

Fig. 4 is a cross-sectional plan view of the slat fingers as they appear on the section lines 4—4 of Fig. 3; and Fig. 5 is a broken cross-sectional elevation view of the slat as it appears on the section lines 5—5 of Fig. 3.

Now referring to the drawing and, at the outset, particularly to Fig. 1, I designate the frame of the thresher sieve by the numeral 10 and the central member of the sieve by the numeral 11. A conventional adjusting mechanism similar to that shown and described in the Petersen Patent No. 2,105,986 is actuated by the adjustment lever 12. Cross wires 14 are pivoted in the side rails of the frame 10 and are equipped with central cranks attached to the adjustment mechanism (not shown), adjustable by the adjustment lever 12.

Now referring to Fig. 2, it will be observed that the slats are mounted approximately centrally on the cross wires 14, with the rearward baffle section 15 and the forward finger section 18 of about equal length and forming the top wall of the slat. The baffle section 15 has a return bend section 16 which extends to the central wire 14 and is attached thereto by the semicircular section 17, the wire being firmly attached between the semicircular section 17 and the horizontal section 15 by spot welding, or the like.

An arcuate finger member 19 extends downward from the finger section 18 and has a radius from the center of the cross wire 14. I show in dotted outline the position of the slats as they are adjusted into open position, and it will be observed that whereas the parts 19 and 15 abut each other when the slats are in closed position, they are separated from each other whereby an opening occurs between these parts when the slats are adjusted to open position.

Now referring to Fig. 3, it will be observed that the finger section 19 is serrated to provide a plurality of rounded end fingers 20 and rounded end crotch portions 21 between the fingers. It will be further observed, as clearly shown in Fig. 4, that the fingers 20 are formed in convex cross section and the top wall of the slat, as shown in Fig. 5, is formed with alternate ridges 22 and troughs 23, the troughs 23 being opposite the crotch openings 21 to direct grain through the openings and the ridges 22 being opposite the convex fingers 20 to form ridges coacting with the troughs.

An analysis of the slat structure shows that a very stiff structure is provided by the return bend section 16 forming a dual baffle section, and that the entire slat is stiffened structurally by the alternate ridges 22 and the troughs 23 while the convex cross sections of the fingers 20 effectively stiffen the fingers of the slat. By pivoting the slats centrally an effective baffling effect is produced to direct air blasts over the top of the slat. It has been discovered that a better winnowing effect is thus produced for vine-like crops such as soy beans. Further, the convex fingers effectively trap the air blasts in a manner which produces an improved screening effect on the grain as it moves through the troughs on the face of the slat and into the crotch spaces between the fingers. It will be noted that, unlike the Petersen structure, the crotch spaces do not extend up to the top finger section but are confined to the arcuate finger section 19. This structure requires the slats to be tilted in operation because when in horizontal position the crotch openings are completely covered by the abutting baffle edge of the adjacent slat.

From the foregoing description it will be clear that I have provided a thresher screen which is stronger and stiffer while providing an improved winnowing effect.

I now claim as new:

1. In a thresher screen, a frame, air blast winnowing means, hinged adjusting wires extending crosswise in said frame, slat adjusting mechanism for pivoting said cross wires, baffle slats attached near their longitudinal centers to said wires and having at their forward edges downwardly extending flanges, multiple longitudinal fingers formed arcuately about the wire centers and extending downward from said flanges, crotch spaces between the fingers to provide sieve openings for grain, the structure being arranged to tilt the slats centrally to provide crosswise blast baffles by the rear ends of the slats as the sieve openings are increased.

2. In a thresher screen, a frame, air blast winnowing means, hinged adjusting wires extending crosswise in said frame, slat adjusting mechanisms for pivoting said cross wire, substantially flat top baffle slats attached centrally to said wires and having at their forward edges downwardly extending flanges, the attachment being accomplished by reverse bending of the rear end of the slat back to the wire, multiple longitudinal round ended fingers formed arcuately about the wire centers and extending downward from said flanges, round ended crotch spaces between the fingers to provide sieve openings for the grain, the structure providing means to progressively tilt the rear ends of the slats to provide more abrupt and effective cross blast baffles as the sieve openings are increased.

3. In a thresher screen, a frame, air blast winnowing means, hinged adjusting wires extending crosswise in said frame, slat adjusting mechanisms co-acting with said cross wires, substantially flat top baffle slats attached centrally to said wires and having at their forward edges downwardly extending flanges, multiple longitudinal fingers formed arcuately about the wire centers and extending downward from said flanges, stiffener embossments in the fingers and adjacent flange and top sections of the slats, crotch spaces between the fingers to provide sieve openings for grain, the structure providing means to progressively tilt the rear ends of the slats to provide more abrupt and effective crosswise blast baffles by the downward tilt of the rear ends of the slats as the sieve openings are increased.

4. In a thresher screen, a frame, air blast winnowing means, hinged adjusting wires extending crosswise in said frame, slat adjusting mechanisms co-acting with said cross wires, substantially flat top baffle slats attached centrally to said wires and having at their forward edges downwardly extending flanges, multiple longitudinal fingers formed arcuately about the wire centers and extending downward from said flanges, stiffener embossments in the fingers and adjacent flange and top sections of the slats, crotch spaces between the fingers to provide sieve openings for grain, said embossments in the top section providing grain troughs for directing grain through the crotch spaces of an adjacent slat when in open position, the structure providing means to progressively tilt the rear ends of the slats to provide more abrupt and effective crosswise blast baffles by the downward tilt of the rear ends of the slats as the sieve openings are increased.

5. In a thresher screen having a frame with means for pivotally mounting winnowing slats and means for adjusting the position of the slats, each of said slats comprising a top wall and a forward wall depending from the forward edge of the top wall, said forward wall being provided for part way up said forward wall with crotches to provide therebetween downwardly directed fingers and above said crotches a continuous wall portion forming an extension from said top wall.

6. In a thresher screen having a frame with means for pivotally mounting winnowing slats and means for adjusting the position of the slats, each of said slats comprising a top wall and a forward wall depending from the forward edge of the top wall, said forward wall being provided for part way up said forward wall with crotches to provide therebetween downwardly directed fingers and above said crotches a continuous wall portion forming an extension from said top wall, said top wall having troughs extending across said slat and being located to be in line with the upwardly projected axes of said crotches.

7. In a thresher screen having a frame with means for pivotally mounting winnowing slats and means for adjusting the position of the slats, each of said slats comprising a top wall and a forward wall depending from the forward edge of the top wall, said forward wall being provided for part way up said forward wall with crotches to provide therebetween downwardly directed fingers and above said crotches a continuous wall portion forming an extension from said top wall, said top wall having ridges opposite said fingers in line with the upwardly projected centerlines of said fingers.

8. In a thresher screen having a frame with means for pivotally mounting winnowing slats and means for adjusting the position of the slats, each of said slats comprising a top wall and a forward wall depending from the forward edge of the top wall, said forward wall being provided for part way up said forward wall with crotches to provide therebetween downwardly directed fingers and above said crotches a continuous wall portion forming an extension from said top wall, said top wall having troughs extending across said slat and being located to be in line with the upwardly projected axes of said crotches, said top wall having ridges opposite said fingers in line with the upwardly projected centerlines of said fingers.

9. In a thresher screen having a frame with means for pivotally mounting winnowing slats and means for adjusting the position of the slats, each of said slats comprising a top wall and a forward wall depending from the forward edge of the top wall, said forward wall being provided for part way up said forward wall with crotches to provide therebetween downwardly directed fingers and above said crotches a continuous wall portion forming an extension from said top wall, said fingers having the outer forward surfaces thereof of convex cross-sectional form for affording reinforcement thereto.

10. A sieve slat of the character described comprising an elongated strip adapted to be hingedly supported for tilting movement, said slat having a top wall with a downturned flange at the extreme forward edge thereof, and fingers carried by said flange and extending downwardly therefrom.

11. A sieve slat of the character described comprising an elongated strip adapted to be hingedly supported for tilting movement, said slat having a top wall with a downturned flange at the extreme forward edge thereof, and fingers carried by said flange and extending downwardly therefrom, each of said fingers being of concavo-convex cross-section with the convex side thereof facing outward forwardly of the slat.

WILLIAM A. HOLTZMAN.